United States Patent Office 2,948,636
Patented Aug. 9, 1960

2,948,636
ANTIMONY COATING FOR GLASS

Thomas Robert Santelli and Thomas G. Erard, Toledo, Ohio, assignors to Owens-Illinois Glass Company, a corporation of Ohio No Drawing. Filed July 16, 1957, Ser. No. 672,105

11 Claims. (Cl. 117—46)

This invention relates generally to a metal containing organic material and to a method of applying it to a substrate. More specifically, this invention relates to an antimony coating and a method of depositing same on a vitreous surface.

Films or deposits of antimony and other similar metals on a substrate, and particularly a glass surface, are desirably achieved for several reasons. The reflectance characteristics of the base glass can be changed, thereby bringing about a change in the light or heat transmission thereof. It is also possible by such coatings to impart electrical conductivity to the glass surface, providing utility in a variety of electrical applications. These coatings are also useful in various metal to glass solder sealing applications such as are encountered in the production of television picture tubes, to name a specific example.

Heretofore, antimony has been applied to a glass substrate in the inorganic form. The usual procedure known in the art is to mix antimony oxide ($Sb_2O_3$) and soda ($Na_2CO_3$) in the desired proportions and heat the mixture to form a molten vitreous mass. The molten vitreous mass is then physically applied by spreading it on a hot glass surface. Fusion between the molten vitreous mass containing antimony oxide and the glass surface occurs and, on cooling, there is produced a coating on the glass, which coating contains antimony. Inorganic methods of the type described above are practiced only with difficulty due to the high temperatures e.g. 1000° F. or greater, which must be employed. Furthermore, the fact that the hot vitreous mass must be physically applied makes any accurate control of the thickness of the film or deposit nearly impossible, while extremely thin coatings are impossible to achieve by any known methods.

Accordingly, it is an object of this invention to provide a method for depositing antimony on a glass substrate which utilizes antimony in a liquid form, whereby the thickness of the final deposit can be accurately controlled.

It is another object of this invention to provide a method of depositing antimony on a glass substrate which utilizes antimony in the form of an organic compound, whereby the elevated temperatures associated with the deposition of antimony in inorganic form is avoided.

It is also an object of this invention to provide a liquid organic form of antimony.

It is a further object of this invention to provide such a method which permits the production of a glass article having a selectively varying degree of reflectance.

It is still another object of this invention to provide such a method which permits the production of a glass article having a selectively varying degree of electrical conductivity.

These and other objects of this invention will become apparent from the following detailed description and the examples which are recited for the purpose of illustrating a few specific embodiments of this invention.

This invention is basically concerned with the discovery that the reaction under reflux conditions between an antimony trihalide and an alkyl orthosilicate yields a liquid organic form of antimony, namely, a trialkoxy stibine having the general formula $Sb(OR)_3$, where R is a hydrocarbon. It has previously been reported that antimony trifluoride, $SbF_3$, and ethyl orthosilicate, $$Si(OC_2H_5)_4$$

would react under reflux conditions to yield diethyl difluorosilicate. $(C_2H_5)_2 SiF_2$, and triethyl fluorosilicate, $(C_2H_5)_3 SiF$. This reaction is reported in the Journal of American Chemical Society in volume 68 (1946), at page 76. It has not previously been reported, however, that this reaction yields the material triethoxy stibine, $Sb(OC_2H_5)_3$.

This invention further contemplates the discovery that the trialkoxy stibine may be conveniently utilized in any one of several ways to effect a deposit or coating of antimony on a substrate, and particularly, a vitreous substrate such as a glass surface.

To effect a mirror-like deposit or coating of the antimony on a glass surface, certain conditions must be present. In general, the conditions involved are hydrolysis, reduction, and heat. The latter two are conveniently provided by a gentle reducing flame such as produced by burning of a hydrocarbon gas in a Bunsen burner. The triethoxy stibine may be first hydrolyzed with an excess of water to yield a hydrolysis product thereof. This product, while its exact nature is not known, will be in the form of a fluid aqueous slurry. This can then be simply applied to the surface of glass and the coated glass surface then heated gently in a reducing flame. A mirror-like deposit of the antimony will form immediately. The hydrolysis reaction for an alkoxy stibine is as follows:

$$Sb(OR)_3 + HOH \rightleftharpoons ROH + Sb(OH)_3 \\ + (RO)Sb(OH)_2 + (RO)_2Sb(OH)$$

The foregoing is in accordance with the generally accepted concept of the nature of the hydrolysis of an alkoxy radical. The principal hydrolysis product comprises a molecular structure containing antimony, having bonded thereto alkoxy radicals and hydroxyl radicals. A plurality of such molecules containing hydroxyl radicals is conducive to a condensation reaction with the elimination of water, yielding a linear polymer having a general formula as follows:

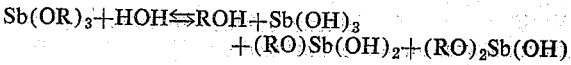

or a similar linear polymer containing an occasional hydroxyl group in place of one of the R groups. Instead of a linear polymer, there may be formed a cyclic closed chain polymer having a general formula of the following type:

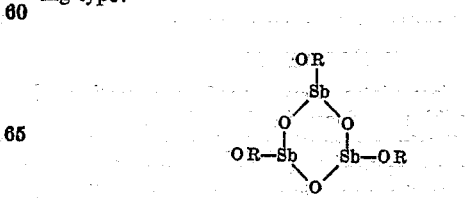

Depending on the degree of hydrolysis, the product may be of the foregoing type but with one or more of the R groups replaced by a hydroxyl radical. The latter would favor the formation of a polycyclic ethereal polymer having a general formula as follows:

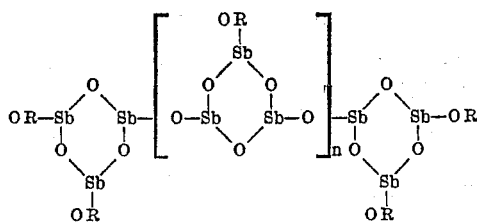

EXAMPLE I

In accordance with the procedure described at page 76 in volume 68 (1946) of the Journal of the American Chemical Society, there was mixed and heated in a boiling flask connected to a 26″ packed column, a mixture of 833 gms. (4.0 mols) of ethyl orthosilicate, 477 gms. (2.7 mols) of antimony trifluoride and, as a catalyst, 2 gms. of antimony pentachloride. The above mixture was refluxed for two hours, followed by a distillation to remove liquid products. The products were separated by rectification to yield the following: several mls. having a boiling point of 65° C.; 25 mls. having a boiling point of 83.5° C., $(EtO)_2SiF_2$; 50 mls. having a boiling point of 133.5° C., $(EtO)_3SiF$; 250 mls. having a boiling point of 164.5° C., $(EtO)_4Si$.

EXAMPLE II

The same reaction as described in Example I was carried out, except that products were recovered after 15 minutes of reflux. This procedure yielded the following fractions: 20 mls. boiling at 65° C.; 175 mls. boiling at 75° C. to 85° C., $(EtO)_2SiF_2$; 300 mls. boiling at 165° C., $(EtO)_4Si$; and 250 mls. boiling at about 196° C. The fraction boiling at 196° C. was redistilled to obtain about 200 mls. of a pure, constant boiling (196° C.) fraction at atmospheric pressure. This constant boiling fraction had a density at 25° C. of 1.502 gms./cc. In view of the nature of the reaction and the boiling point of 196° C., it was suspected that this fraction represented the liquid compound triethoxy stibine, $Sb(OC_2H_5)_3$. The fraction was, therefore, analyzed quantitatively for carbon, hydrogen, alkoxyl group, and antimony. The results of the analysis are given in Table 1, together with the calculated values for the compound $Sb(OC_2H_5)_3$.

*Table 1*

|  | Found, Percent | Calculated, Percent |
| --- | --- | --- |
| Carbon | 29.80 | 28.01 |
| Hydrogen | 6.16 | 5.85 |
| Alkoxyl | 45.31 | 52.18 |
| Antimony | 48.90 | 47.40 |

EXAMPLE III

A portion of the fraction (boiling at 196° C.), produced in Example II and found to constitute triethoxy stibine, was combined with an excess quantity of water. Hydrolysis occurred and the resulting liquid slurry was poured onto a flat glass surface and heated by contact with a gentle reducing flame issuing from a Bunsen burner until a mirror appeared. The mirror-like deposit was integrally bonded to the glass substrate.

EXAMPLE IV

Two small glass plates were dipped in a portion of the triethoxy stibine produced in Example II. One was exposed immediately to a gentle reducing flame and then exposed to the atmosphere. A mirror appeared after a short exposure to the prevailing atmospheric conditions. This mirror deposit of antimony was integrally bonded to the glass substrate. The second glass plate was withdrawn from the triethoxy stibine and exposed for a few seconds to the prevailing atmospheric conditions, followed by exposure to a gentle reducing flame. A mirror deposit of antimony appeared shortly, which deposit was integrally bonded to a glass substrate.

EXAMPLE V

A piece of laboratory glass plate was heated to about 400° C. to 500° C. A portion of the triethoxy stibine produced in Example II was sprayed on the hot glass surface and the thus coated glass was heated in a gentle reducing flame. A mirror appeared within a minute, representing an extremely thin deposit of antimony integrally bonded to the glass substrate.

EXAMPLE VI

A small portion of triethoxy stibine, produced as described in Example II, was sprayed on a small laboratory glass plate at room temperature. The sprayed plate was immediately exposed to a gentle reducing flame for a period of several minutes. Shortly after the flame was removed, the appearance of a silvery deposit was noted.

EXAMPLE VII

A small amount of a hydrolyzed slurry of the triethoxy stibine was prepared as described in Example III. A small amount of potassium carbonate ($K_2CO_3$) was added and the mixture applied to a glass surface, followed by heating in a gentle reducing flame, whereupon there was observed the production of a silver mirror deposit on the glass substrate.

EXAMPLE VIII

To a small portion of triethoxy stibine, produced as described in Example II, there was added a small amount of ethylene diamine. Half of this was applied to a glass surface and the coated glass heated in a gentle reducing flame. Removal of the flame and subsequent exposure to moist atmospheric conditions yielded a silver mirror deposit on the glass substrate. The other half of the described mixture was hydrolyzed with excess water, the hydrolysis solution applied to the surface of a laboratory glass plate and the coated glass exposed to a gentle reducing flame. A silvery mirror appeared immediately on the surface of the glass.

EXAMPLE IX

A small portion of triethoxy stibine, produced as in Example II, together with a small amount of potassium carbonate, was added to laboratory grade ethanol (containing a minor amount of water). This solution was applied to glass and the mixture heated in a gentle reducing flame. There was immediately formed a mirror-like finish over all the surface of the thus coated glass.

EXAMPLE X

A small amount of sodium tetraborate $Na_2B_4O_7$ was added to a portion of the triethoxy stibine product. A laboratory type glass plate was dipped into this liquid solution and upon removal was inserted into the reducing portion of the flame issuing from a Bunsen burner. Immediately there was observed a silvery deposit demonstrating the presence of an antimony coating on the glass plate.

Inasmuch as ethyl orthosilicate $(EtO)_4Si$, is the only commercially available silicate, the experiments have been restricted to such. In view of the characteristic of the overall reaction involved herein, it would be appreciated that other orthosilicates containing other substituted alkyl groups, and particularly short-chain alkyl groups, could be used instead of the ethyl orthosilicate. By the term short-chain alkyl group is meant a lower alkyl group, e.g., one containing from 1 to 6 carbon atoms.

As indicated hereinbefore, and as demonstrated by the foregoing examples, the actual sequence of the hydrolysis, reduction, and heat is not generally critical, inasmuch as a silvery mirror-like deposit is observed regardless of the sequence. Where it would be desirable to produce a fairly thick coating or deposit, it would be most desirable to first form a hydrolysis product of the trialkoxy stibine and then accurately control its application to the substrate to be coated by a squeegee operation, followed thence by the heating in a reducing type flame as, for instance, in a gas flame oven. Where very thin coatings or deposits of antimony would be desired, it would be preferable to apply the trialkoxy stibine by spraying a fine mist of the triethoxy stibine, followed by simultaneous hydrolysis and reduction in an atmosphere characterized by having a high relative humidity.

The nature of the hydrolysis product of the trialkoxy stibine does not appear to be particularly critical. Thus, as indicated hereinbefore, the amount of water in proportion to the amount of material to be hydrolyzed will ordinarily determine the nature of the hydrolysis product. Furthermore, the time of reaction, e.g., the time that the material to be hydrolyzed is in contact with the water, is a factor influencing the character of the hydrolysis product. The examples demonstrate that neither of these are especially critical, inasmuch as the deposit of antimony was effected both with the hydrolysis product resulting from an excess of water held for an appreciable length of time in contact with the trialkoxy stibine, and the hydrolysis product resulting from the moisture in the air or the moisture present in laboratory grade ethanol.

By using a very fine atomizing spray for the purpose of applying the trialkoxy stibine to the surface of the glass, it is possible to achieve a molecular deposit of the trialkoxy stibine, thus permitting extremely accurate control of the reflectivity and/or conductivity characteristics of the antimony coated glass surface.

The concept of this invention has wide application in a variety of specific end uses of marked utility. Thus, the practice of this invention can be used to produce films of antimony on glass which would be just sufficient to conduct electricity and thereby permit convenient de-icing of the glass. This application would be extremely beneficial for automobile windshields, airplane windshields, and the like. The practice of this invention could also be carried out with window glass to provide a reflective coating which would eliminate the radiant heat effects of sun rays. The practice of the present invention could also be used to up-grade glasses of low chemical durability by providing a deposit of antimony for surface protection.

While we have disclosed certain preferred manners of performing our invention, we do not thereby desire or intend to limit ourselves solely thereto, for the precise proportion of the materials utilized may be varied, and equivalent chemical materials may be employed, if desired, without departing from the spirit and scope of the invention as defined in the appended claims.

We claim:

1. The method of depositing antimony on a ceramic body, which comprises applying thereto the products of hydrolysis of a material having the general formula $Sb(OR)_3$, wherein R is a lower alkyl group, and subjecting said material to reducing conditions.

2. The method of effecting a deposit of antimony on a ceramic body, which comprises applying a material having the general formula $Sb(OR)_3$, wherein R is a lower alkyl group, to the surface of said body, and subjecting said material to hydrolysis and reduction.

3. The method of depositing antimony on glass, which comprises applying the hydrolysis product of a material having the general formula $Sb(OR)_3$, wherein R is a lower alkyl group, to the surface of said glass, and heating the coated glass in a reducing flame.

4. The method of depositing elemental antimony on glass, which comprises applying the material $Sb(OR)_3$, wherein R is a lower alkyl group, to the surface of the glass, exposing the coated surface to a hydrolytic atmosphere, and heating in a reducing flame.

5. The method of depositing elemental antimony on glass, which comprises applying the material $Sb(OR)_3$, wherein R is a lower alkyl group, to the surface of the glass, heating the coated surface in a reducing flame, and exposing the resultant to hydrolysis in situ.

6. The method of depositing antimony on a ceramic body, which comprises applying a material having the general formula $Sb(OR)_3$, wherein at least one R is a lower alkyl group and the remaining R's are being hydrogen atoms, to the surface of said body and subjecting the material to reducing conditions.

7. The method of depositing antimony on glass, which comprises heating the glass to a temperature of about 400° C., applying thereto the hydrolysis product of a material having the general formula $Sb(OR)_3$, wherein R is a lower alkyl group, and heating the coated glass in a reducing flame.

8. The method of depositing antimony on a ceramic body, which comprises applying to the surface of said body a material having a formula selected from the group consisting of: $Sb(OR)_3$ as a monomer, wherein R is selected from the group consisting of hydrogen atoms and lower alkyl groups, with the proviso that at least one R must be an alkyl group;

$$\underset{(HO)_{0 \text{ to } (x-1)}}{\overset{(RO)_x}{\diagdown}} \left[ Sb-O \right]_n$$

as a linear polymer, wherein R has the same meaning as before, $n$ is a positive whole integer, and $x$ is at least 1 and not greater than $2n$; the same formula as the preceding as a cyclic closed chain polymer; and the same formula as the preceding as a polycyclic ethereal polymer; and subjecting said material to reducing conditions.

9. A method of producing an antimony coated glass substrate, which comprises reacting ethyl orthosilicate and antimony trifluoride under reflux conditions, separating a constant boiling fraction of the reflux reaction, said fraction conforming to the structural formula $Sb(OC_2H_5)_3$, applying the latter to a glass substrate while at the same time exposing the situs of application to hydrolytic and reducing conditions.

10. A method of producing an antimony coated glass substrate which comprises reacting a lower alkyl orthosilicate and an antimony trihalide under reflux conditions, separating a constant boiling fraction of the reflux reaction, said fraction having the structural formula $Sb(OR)_3$, wherein R is a lower alkyl group, applying said fraction to a glass substrate while at the same time exposing the situs of said application to hydrolytic and reducing conditions.

11. A method of producing an antimony coated glass substrate which comprises reacting a lower alkyl orthosilicate and an antimony trihalide under reflux conditions, separating a constant boiling fraction of the reflux reaction which conforms to the structural formula $Sb(OR)_3$, wherein R is a lower alkyl group, combining said latter fraction with water to form a hydrolysis product thereof, and applying the hydrolysis product to a glass substrate and exposing same to reducing conditions.

References Cited in the file of this patent

UNITED STATES PATENTS

| | | |
|---|---|---|
| 2,162,980 | Smith | June 20, 1939 |
| 2,292,026 | Gillet | Aug. 4, 1942 |
| 2,384,384 | McGregor et al. | Sept. 4, 1945 |
| 2,564,677 | Davis | Aug. 21, 1951 |
| 2,629,724 | Wilton | Feb. 24, 1953 |
| 2,647,910 | Archer et al. | Aug. 4, 1953 |

OTHER REFERENCES

Journal of Am. Ch. Society, vol. 68 (1946), page 76.